July 14, 1931.  W. RHODES  1,814,094
EARTH EXCAVATOR FOR TILE DITCHING
Filed Dec. 30, 1927  3 Sheets-Sheet 2
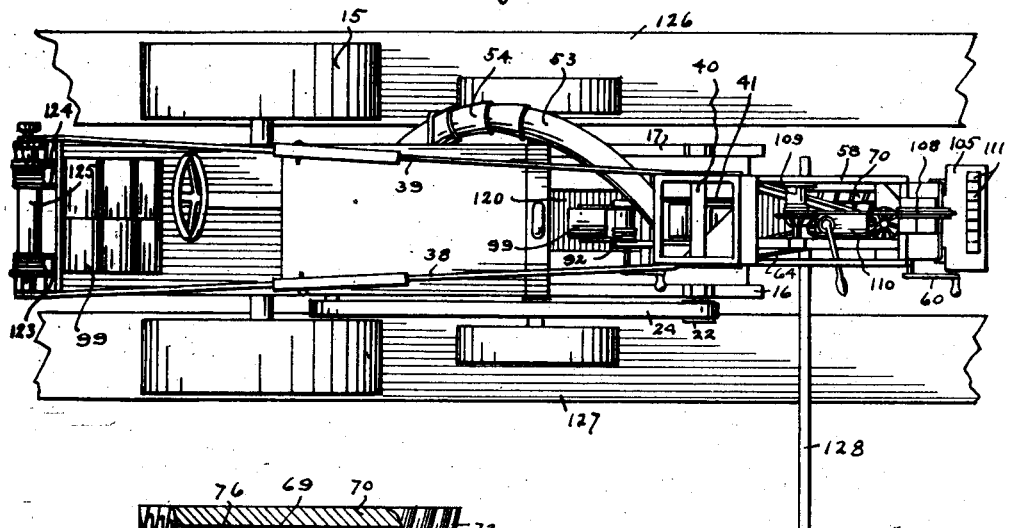
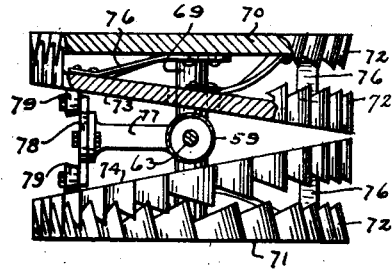
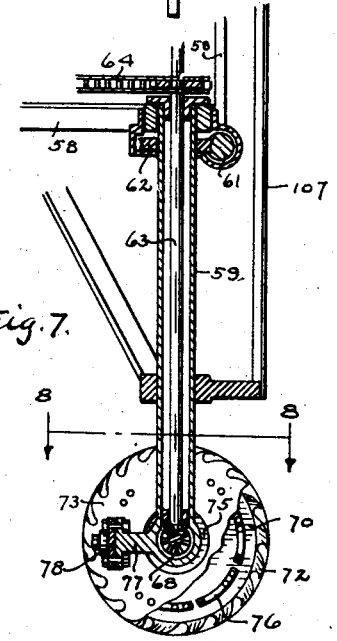
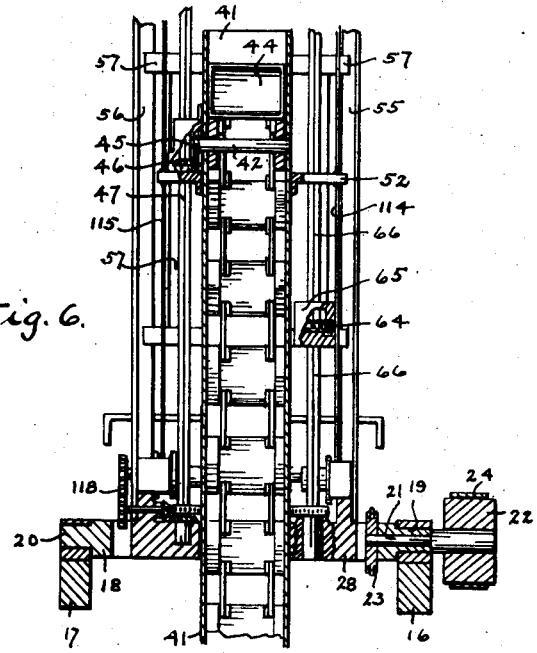
INVENTOR,
Walter Rhodes,
By Minturn & Minturn,
Attorneys.

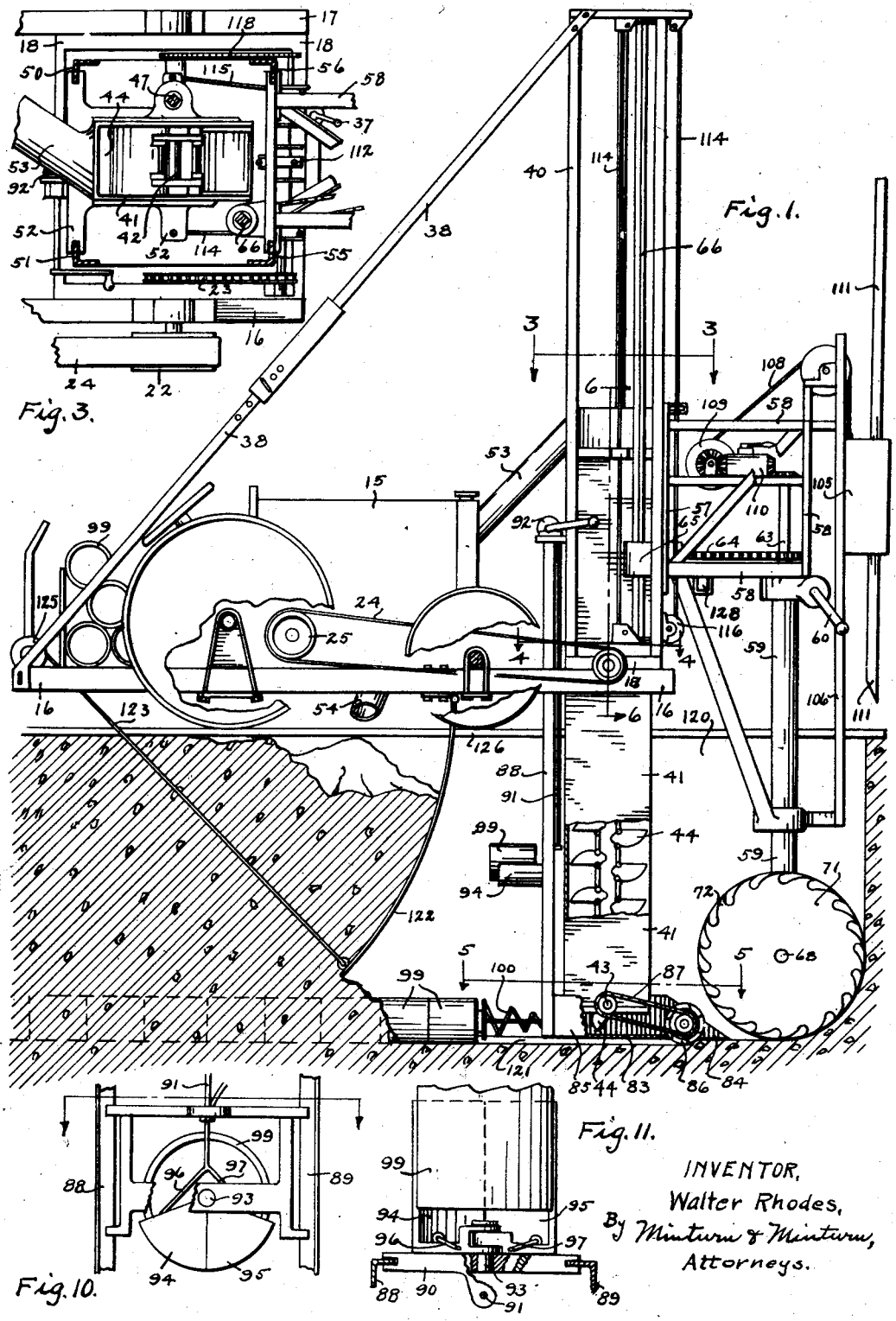

July 14, 1931.　　W. RHODES　　1,814,094
EARTH EXCAVATOR FOR TILE DITCHING
Filed Dec. 30, 1927　　3 Sheets-Sheet 3

INVENTOR,
Walter Rhodes,
By Minturn & Minturn,
Attorneys.

Patented July 14, 1931

1,814,094

UNITED STATES PATENT OFFICE

WALTER RHODES, OF TERRE HAUTE, INDIANA

EARTH EXCAVATOR FOR TILE DITCHING

Application filed December 30, 1927. Serial No. 243,588.

This invention relates to an earth excavator for tile ditching, one particular form of which is shown in the accompanying drawings, in which—

Figure 4:
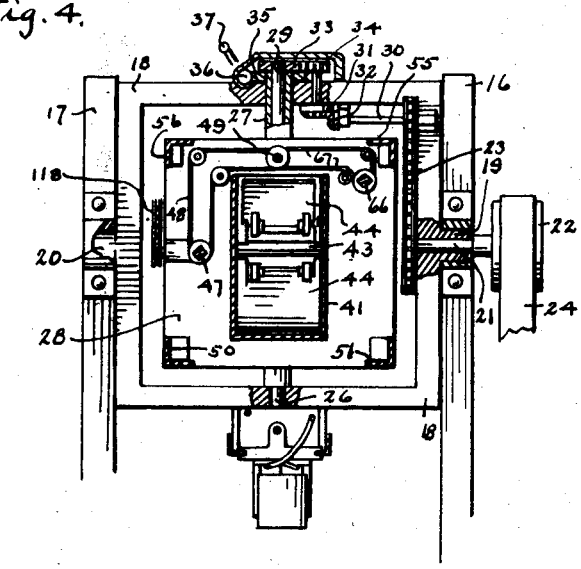
Figure 12:
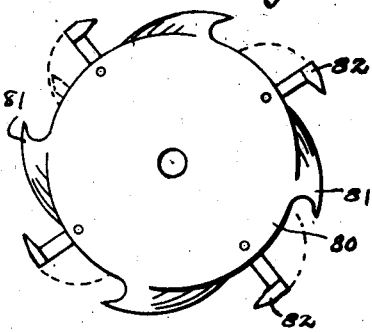
Figure 5:
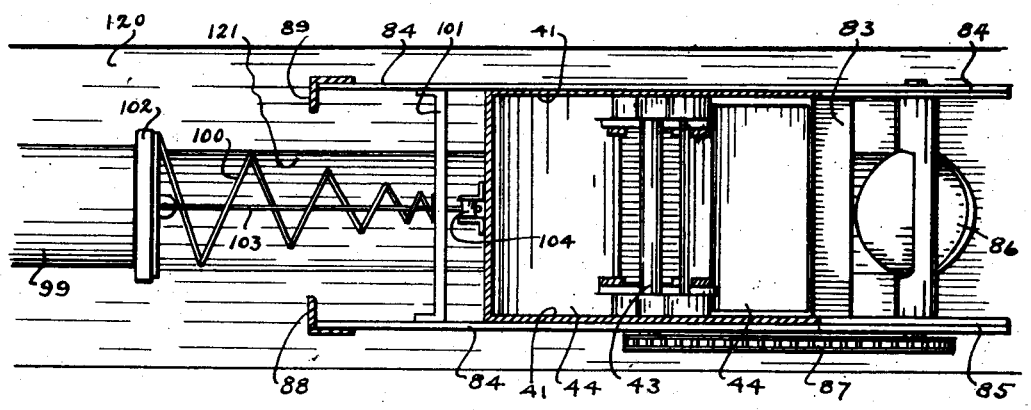
Figure 9:
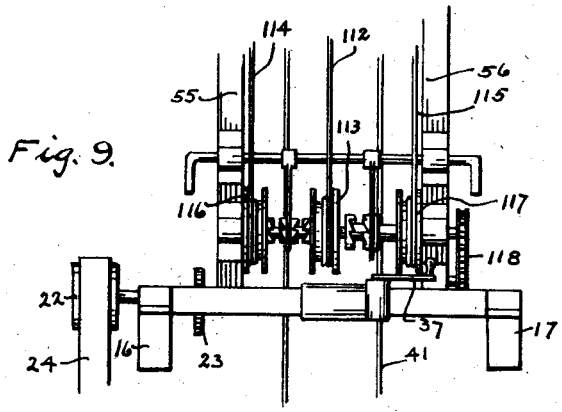

Fig. 1 is a fragmentary side elevation of the excavator shown in reference to a ditch;

Fig. 2, a top plan view of the excavator;

Fig. 3, a transverse, horizontal section through the tower of the excavator on the line 3—3 in Fig. 1, on an enlarged scale;

Fig. 4, a transverse section through the tower on the line 4—4 in Fig. 1, on an enlarged scale;

Fig. 5, a transverse section through the tower end of the conveyor housing on the line 5—5 in Fig. 1, on a still further enlarged scale;

Fig. 6, a vertical section through the tower on the line 6—6 in Fig. 1;

Fig. 7, a vertical section on the longitudinal central axis of the excavator through the rotary cutting mechanism carried forwardly of the tower;

Fig. 8, a transverse section on the line 8—8 in Fig. 7;

Fig. 9, a front elevation of the conveyor and cutter elevating mechanism;

Fig. 10, a rear elevation of the conveyor and cutter elevating mechanism;

Fig. 11, a top plan view of the tile positioning unit;

Fig. 12, a side elevation of a modified form of the rotary cutter; and

Figure 13:
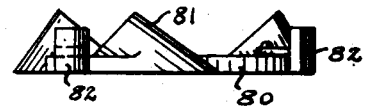

Fig. 13, a top plan view of the modified rotary cutter.

Like characters of reference indicate like parts throughout the several views of the drawings.

I employ a tractor 15 as a power and carrying unit to the underside of the axles of which I removably secure the two spaced apart longitudinal rails 16 and 17 to have them project both forwardly and rearwardly from the tractor. Between the forward ends of the rails 16 and 17, in front of the tractor 15, I pivotally mount a frame 18 to rock on its trunnions 19 and 20, the trunnion 19 being bored centrally therethrough to permit the shaft 21 to be revolvably carried therein to have the driving pulley 22 on the outer end and a sprocket on the inner end within the frame 18 to drive the chain 23, the pulley 22 being driven by the belt 24 from the tractor driving pulley 25.

On the longitudinal center line of the frame 18, I pivotally support the trunnions 26 and 27 which carry the tower base 28 within the frame 18. The trunnion 27 is bored axially to permit the shaft 29 to revolve therein through the chain 23, the shaft 30, the bevel gears 31 and 32 and the spur gears 33 and 34, the gear 33 being secured on the outer end of the shaft 29.

A worm gear 35 is fixed on the outer end of the trunnion 27 to be engaged by the worm 36 which is revolved by the external crank 37 as a means of rocking and retaining the base 28 at desired angles to the frame 18. The frame 18 is tilted to desired angles with the rails 16 and 17 and retained by the adjustable braces 38 and 39 which extend from the rear ends of the rails 16 and 17 diagonally upwardly to the top of the tower 40 which is rigidly carried by the base 28.

Positioned substantially within the center of the tower 40 and slidingly passing through the base 28, is the conveyor housing 41, at the top and bottom of which are the transverse shafts 42 and 43 around which pass an endless chain of conveyor buckets 44. This chain of buckets is driven by the top shaft 42 (Fig. 6) which extends without the housing 41 to carry the bevel gear 45 which meshes with the gear 46 which is driven by the vertically disposed shaft 47. The shaft 47 square in cross section is pivotally secured between the base 28 and the top of the tower 40, and the gear 46 slides vertically along the shaft 47 as the housing 41 may be raised or lowered, so that the conveyor shaft 42 may be driven at any elevation of the housing 41. The shaft 47 is driven by a chain 48 from the vertical shaft 49 which communicates with the shaft 29 under the base 28.

The tower 40 has two spaced apart vertically disposed and aligned guides 50 and 51 between which is slidingly retained the housing guide plate 52 which engages the upper end of the housing 41 to maintain it in a parallel sliding relation with the guides 50 and 51. A discharge pipe 53 is fitted by one end to the upper part of the housing 41 to receive the dirt from the buckets 44 as they come around over the top shaft 42, and extends diagonally backwardly and downwardly by extensible sections 54 to be carried by the rail 17 so that the dirt coming therethrough may be discharged under the tractor 15.

The forward side of the tower 40 has two spaced apart vertically positioned guides 55 and 56 between which is slidingly carried a crosshead 57 from which a frame 58 projects horizontally and forwardly from the tower 40. A housing 59 is vertically depended (Figs. 1 and 7) from the under forward part of the frame 58, to permit rotation about its vertical axis by turning the crank 60 which revolves the worm 61 in mesh with the worm gear 62 secured to the housing 59.

Within the housing 59 is a vertically disposed drive shaft 63 driven from above through the chain 64 which in turn is driven by a sprocket carried by the bracket 65 attached to the frame 58 through which slidably passes the vertical square shaft 66 which is rotatably carried between the base 28 and the top of the tower 40 so that the shaft 66 will revolve the sprocket sliding vertically thereon, at any elevation of the crosshead 57 in relation to the shaft 66. The shaft 66 is driven through the chain 67 (Fig. 9) from the vertical shaft 49.

The shaft 63 within the housing 59 drives a horizontally disposed shaft 68 at its lower end through bevel gears, within the housing 69, and on the outer ends of the horizontal shaft 68 are secured the rotary discs 70 and 71 on the circumference of which are positioned a plurality of teeth 72 adapted to engage in and loosen earth by rotation of the discs.

Spaced inwardly from each disc 70 and 71 toward the housing 59 are the discs 73 and 74 similarly fitted with circumferential cutting teeth, but each disc having an enlarged central hole 75 therethrough to permit it to revolve around but without contacting the horizontal shaft housing 69. These discs 73 and 74 are held inwardly from the outer discs 70 and 71 and driven therefrom by a plurality of springs 76, the springs being attached by their respective ends between the pair of discs 70 and 73, and the pair 71 and 74. Normally, the revolving of the discs 70 and 71 will carry the discs 73 and 74 around therewith in parallel relation one to the other, but an arm 77 extends from the rear of the housing 59 to carry a transverse bracket 78, on the outer ends of which are rotatably carried the rollers 79 which press the discs 73 and 74 outwardly at the rear, one from the other toward the outer discs 70 and 71, which action in turn causes the forward parts of the discs 73 and 74 to approach each other to tend to fill the gap between the two outer discs 70 and 71, all as shown in Fig. 8. The teeth 72 are so formed and spaced apart as to permit their inter-passing one another without conflict at the rear of the discs when the discs 73 and 74 are pushed toward the discs 70 and 71. The bracket 78 is removably secured to the arm 77 so that it may be turned vertically or removed to permit the inner discs 73 and 74 to run parallel one to the other when desired.

In Figs. 12 and 13 is shown a modified form of disc 80 with a number of cutting teeth 81 about the circumference, here shown as four, and a swinging hammer 82 pivotally attached to the disc 80 to extend radially between and slightly beyond the teeth 81. These hammers 82 are employed where ditches are to be dug through soil containing boulders and the like and operate to strike such boulders ahead of the teeth as the disc is revolved rapidly. By reason of the pivotal attachment of the hammers to the disc, the hammers 82, may rebound after striking such solid objects to fall back below the cutting line of the teeth until they have been carried around past the object whereupon centrifugal action will throw them back out to the radial positions.

Referring now to Figs. 1 and 5, attention is directed to the construction of the lower end of the conveyor housing 41 which is open from the forward side and has a horizontal floor 83 across the bottom, and shoes 84 and 85 are affixed one to each side of the lower end of the housing to extend forwardly to carry the horizontally disposed grooving cutter 86 therebetween, which cutter is driven in a counter-clockwise direction by the chain 87 from the lower conveyor shaft 43.

On the rear side of the housing 41 is secured the spaced-apart vertical guides 88 and 89 to be raised and lowered with the housing 41. (Figs. 1, 10 and 11). Fitted to slide on and be retained by these guides is the slide 90 which may be raised and lowered by the cable 91 affixed thereto and wound about the drum 92 at the top of the guides. A pin 93 projects rearwardly from the slide 90 to pivotally retain thereon the two tile carrying segments 94 and 95 which normally remain in the position as shown in Figs. 10 and 11. Cables 96 and 97 are attached respectively to the segments 94 and 95 and are joined to the releasing cable 98 which extends upwardly as a means of swinging the two segments 94 and 95 apart to let a tile 99 resting thereon slide out therebetween. An elongated, conical compression spring 100 has its apex positioned against a cross member 101 held between th rear extensions of the shoes 84 and 85 and normally extends considerably to the rear, as in Figs. 1 and 5. A block 102 is fixed to the outer base of the spring and a cable 103 attached thereto passes back through the spring and the cross member 101 around a pulley 104 and back up vertically to any convenient point so that the operator may pull on the cable 103 to compress the spring 100 to bring the spring entirely back of the guides 88 and 89 to be out of the way of the slide 90 when it is lowered with a tile.

In addition to the rotary discs 70 and 71 serving as earth loosening means, a bar drilling means is provided when exceptionally hard soil is encountered. This drilling means is comprised of a comparatively heavy crosshead 105 vertically sliding on the guides 106 and 107 which are carried on the front side of the frame 58, and which crosshead may be raised and lowered independently of the elevation of the frame 58 by means of the cable 108 secured thereto and passed back to the drum 109 which may selectively be revolved or held stationary through a clutch means (not shown) within the housing 110 actuated from the upper extension of the shaft 63, the clutch means being any one of the well known and commonly employed devices for that purpose, the details of which do not enter into my invention. A plurality of drills 111 are carried by the crosshead 105 to strike the ground slightly ahead of the discs 70 and 71.

The frame 58, being slidingly supported on the front side of the tower 40 as above described, may be raised and lowered by the cable 112 over the drum 113, and similarly the conveyor housing 41 may be raised and lowered by the pair of cables 114 and 115, each attached to the plate 52, over the drums 116 and 117 (Figs. 1 and 9). The conveyor housing 41 and the frame 58 may be changed in elevation independently one from the other through selective operation of the drums 113, and 116 and 117, which are power actuated from the chain drive 118 in communication with the shaft 47.

In operating the excavator, the housing 41 and the frame 58 are both initially in an elevated position so that the bottom of the housing 41 and the discs 70 and 71 with the intermediate discs are all held above the surface of the earth. If the soil is hard, the drills are raised and dropped to cut and loosen up the earth and the frame 58 is then lowered to have the discs 70 and 71 start cutting behind the drills to kick the dirt back under and upwardly to the rear, the discs, being revolved in a clockwise direction.

The housing 41 is lowered to receive on the floor 83 the dirt so thrown back, from which floor the buckets 44 scoop up the dirt and carry it up to dump it into the pipe 53 which conducts the dirt through the sections 54 back into the ditch 120 being dug so as to fill the ditch as the tractor 15 is moved along. The discs 70 and 71 by their teeth and the intermediate discs define and smooth up the walls of the ditch 120 and determine its depth, the floor 83 of the housing being moved forwardly along on the bottom of the ditch. The groover 86 cuts a groove 121 in the bottom of the ditch and throws the dirt back onto the floor 83, the groove 121 serving as a means for retaining the tiles 99 in alinement. As the ditch 120 is excavated ahead, tiles 99 are lowered by the segments 94 and 95 and deposited in the groove 121, and the spring 100 is released to allow the block 102 to bear against the forward end of the tile so lowered to press the tile against the preceding tiles already laid in the groove. As the housing 41 moves ahead in the ditch, the spring 100 elongates and continues to press back on the tile 99, retaining it in position as the loose dirt rolls down from behind and from under the shield 122 which is pivotally secured to the rails 16 and 17 by its upper end and its lower end held by cables 123 and 124 which may be shortened or lengthened by winding about the drum 125 at the rear of the tractor 15 on the rails 16 and 17. The shield 122 is a flat sheet of metal of a width permitting it to extend down into the ditch.

In laying water pipes when the joints must be calked, the ditch must be widened at each joint to permit room for the workman to calk the joint. By revolving the housing 59 with the crank 60 the discs 70 and 71 are revolved to cut out a portion in the ditch having the diameter of the discs, which excavation gives ample room for the calking operation.

In order to maintain a certain depth level of the ditch 120, the tractor 15 is run on boards 126 and 127, one on each side of the ditch, and an arm 128 is projected from out under the frame 58 as a depth gauge, the arm 128 travelling up and down with the frame 58.

Having described my invention in the one particular form as now best known to me, I do not desire to be limited to that precise form as shown and described, nor any more than may be necessitated by the following claims since it is obvious that many structural changes may be made without departing from the spirit of the invention.

What I claim as new is:

1. In a ditch excavator, rotary cutting means comprising outer members and one or more inner members which inner members are variable in their planes to the outer members, said means being adapted to be raised and lowered.

2. In a ditch excavator, an earth loosening means comprising a pair of outer cutting members and one or more cutters variable in position between the outer pair to cut the earth between the outer pair.

3. In an excavator for digging a ditch, rotary digging means selectively elevatable, a conveyor behind the digging means also selectively elevatable and a ditch bottom groover between the conveyor and digging means and auxiliary drilling means associated with the rotary digging means.

4. In an excavator for digging a ditch, a rotary digging means comprising two spaced apart revolvable discs determining the width of the ditch, intermediate discs each yieldingly carried by and spaced inwardly from said first discs, and means at one side of their axis of rotation pressing apart said intermediate discs to throw the opposite sides of the intermediate discs toward each other and away from said first discs, and teeth on all of said discs.

5. In an excavator for digging a ditch, a rotary digging means comprising outer driven discs, and discs intermediate said outer discs, and means for variable spacing apart the peripheries of the intermediate discs at one side of the axis of rotation to vary the angular relation of the discs to said axis.

6. In an excavator for digging a ditch, a rotary digging means comprising outer driven discs, and discs intermediate said outer discs, means for revolving all of said discs horizontally and means for varying the angular relation of one or more of the discs to their axis of rotation.

7. In a ditch excavating and tile laying device adapted to be attached to a tractor, rails adapted to be secured to the tractor, a tower universally supported on the rails, digging means slidingly carried by the tower, a conveyor slidingly carried by the tower, and power means for raising and lowering said digging means and said conveyor independently of each other.

8. In a ditch excavating and tile laying device adapted to be attached to a tractor, rails adapted to be secured to the tractor, a tower universally supported on the rails, digging means slidingly carried by the tower, a conveyor slidingly carried by the tower, and power means for raising and lowering said digging means and said conveyor independently of each other and a dirt retaining apron adjustably suspended below said rails behind said conveyor.

9. In a ditch excavating and tile laying device adapted to be attached to a tractor, rails adapted to be secured to the tractor, a tower universally supported on the rails, digging means slidingly carried by the tower, a conveyor slidingly carried by the tower, and power means for raising and lowering said digging means and said conveyor independently of each other and a dirt retaining apron adjustably suspended below said rails behind said conveyor and dirt conducting means from said conveyor discharging back of said apron.

10. In a ditch excavator a rotary cutter comprising outer members and inner members, the positions of the inner members being variable laterally toward and from the outer members.

11. In a ditch excavator, a rotary cutter comprising outer members and inner members, the positions of the inner members being variable laterally toward and from the outer members and means for varying their relation.

12. In a ditch excavator a rotary cutter comprising a plurality of members the planes of some of which are variable in distance relative to some of the others.

13. In a ditch excavator, a rotary cutter comprising one or more members the planes of which are constant, and one or more other members, the planes of which are oblique to and variable in distance with reference to the first members.

14. In a ditch excavating machine, a rotary cutter comprising a pair of cutters spaced apart, one or more cutting members between said pair and springs connecting the last cutters with the first, thereby rendering the last cutters adjustable in relation of their planes to the first pair of cutters.

In testimony whereof I affix my signature.

WALTER RHODES.